(12) United States Patent
Kokubun et al.

(10) Patent No.: US 8,130,521 B2
(45) Date of Patent: Mar. 6, 2012

(54) ON-VEHICLE CHARGING GENERATOR AND RECTIFIER UNIT THEREOF

(75) Inventors: Shuichi Kokubun, Naka (JP); Shoju Masumoto, Hitachiota (JP); Keiji Kunii, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 397 days.

(21) Appl. No.: 12/470,716

(22) Filed: May 22, 2009

(65) Prior Publication Data

US 2009/0302678 A1    Dec. 10, 2009

(30) Foreign Application Priority Data

Jun. 6, 2008    (JP) ................. 2008-148716

(51) Int. Cl.
*H02M 7/217*    (2006.01)
(52) U.S. Cl. .......................... 363/81; 363/89
(58) Field of Classification Search .......... 363/44, 363/81, 84, 87–89, 127, 125, 129, 48, 52–53
See application file for complete search history.

(56) References Cited

U.S. PATENT DOCUMENTS 5,748,463 A * 5/1998 Tsutsui et al. ............... 363/127

FOREIGN PATENT DOCUMENTS

JP    2004-7964 A    1/2004

OTHER PUBLICATIONS

Stephan Rees, et al. "A smart Synchronous rectifier for 12 V Automobile Alternators", University of Stugttart, Institute of Power Electronics and Control Engineering, Jun. 2003, pp. 1516-1521.

* cited by examiner

*Primary Examiner* — Harry Behm
(74) *Attorney, Agent, or Firm* — Crowell & Moring LLP

(57) ABSTRACT

In a rectifier unit having a MOSFET, there is provided a stable MOSFET rectifying operation which is not influenced by a power generation condition from a start of an engine. An output VS obtained by adding phase voltages VU, VV, and VW and a power generation voltage VBR are compared by COM1. During a period of VBR>VS, a timing signal VT having a cycle of an electrical angle of 120 degrees is obtained. In synchronism with rising of logical products AND1 and AND2 based on a comparison result VH-ON of a phase voltage VU and a power generation voltage VB and a comparison result VL-ON of a phase voltage VU and a GND potential, flip-flops FF1 and FF2 are operated. Then, a gate signal VHGD of an upper-stream side MOSFET and a gate signal VLGD of a lower-stream side MOSFET are outputted to execute a MOSFET rectifying operation.

13 Claims, 8 Drawing Sheets

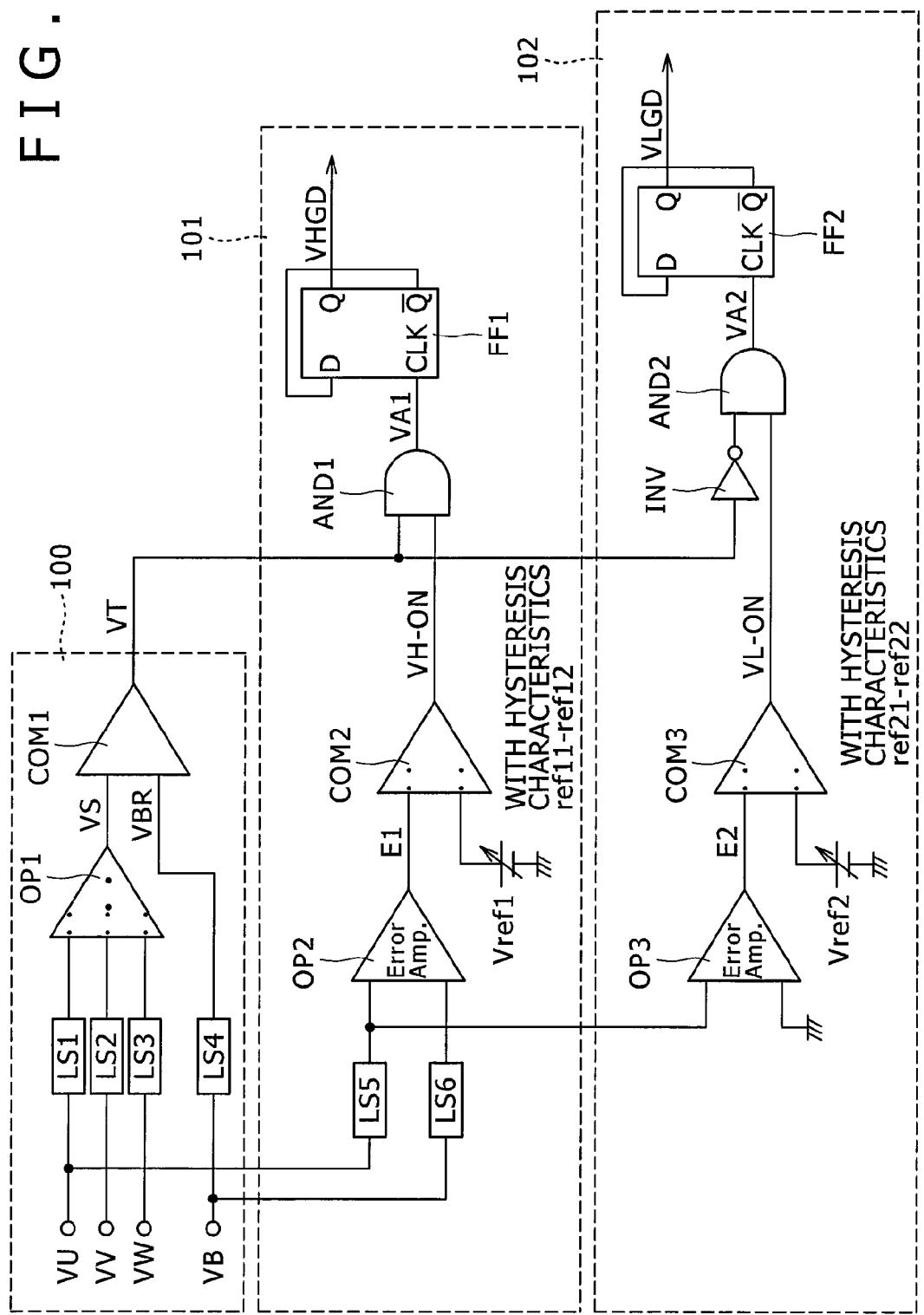
F I G . 2

FIG.8
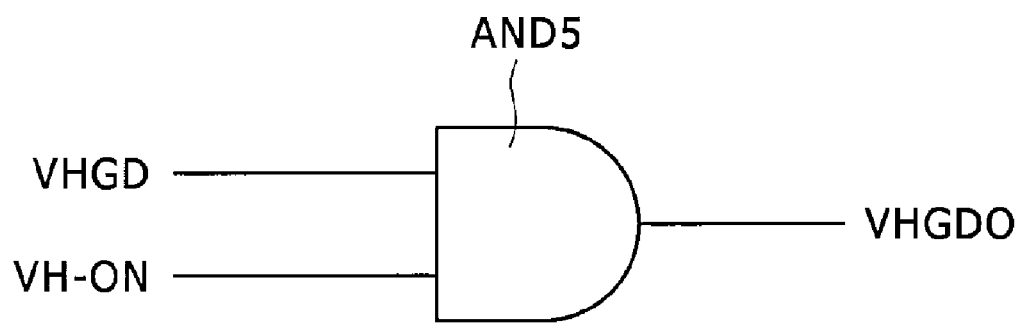
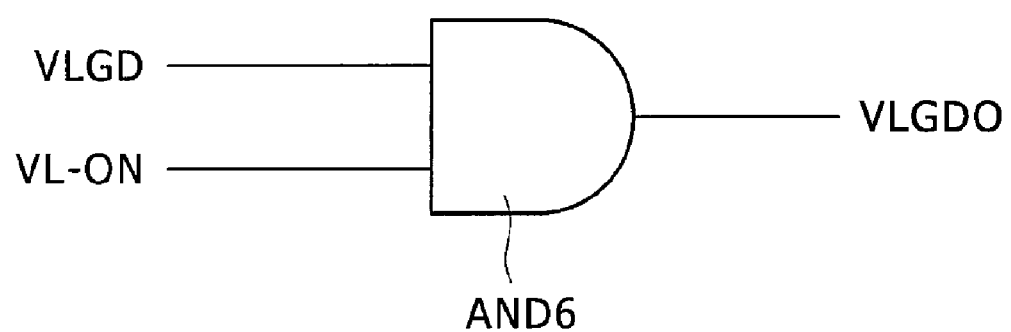

ON-VEHICLE CHARGING GENERATOR AND RECTIFIER UNIT THEREOF

FIELD OF THE INVENTION

The present invention relates to an on-vehicle charging generator and a rectifier unit thereof.

BACKGROUND OF THE INVENTION

With regard to a rectifier unit of an on-vehicle charging generator, and specifically, with regard to a full-wave rectifier for rectifying a three-phase AC electric power generated by an armature winding, in order to reduce its power loss, there is proposed a full-wave rectifier comprising a MOSFET (metal oxide semiconductor field-effect transistor).

For example, as a control circuit for causing a MOSFET of a predetermined phase to be conductive or non-conductive, there is known a technology for turning on or off an arm element for rectifying an electric current of the predetermined phase when a voltage of a phase different from the predetermined phase exceeds a threshold value (see, for example, Japanese Patent Laid-open No. 2004-7964).

SUMMARY OF THE INVENTION

However, the conventional technology described above has not fully taken into consideration an increase in power loss caused by rectification by a parasitic diode when a voltage set value for power generation is low, distortion in a phase voltage when starting an engine, etc.

An object of the present invention is to provide an on-vehicle charging generator and a rectifier thereof with which highly efficient and stable operation can be attained.

According to an embodiment of the present invention, an on-vehicle charging generator and a rectifier unit thereof include: a rectifier circuit which full-wave rectifies an AC output voltage of an armature winding, which outputs a three-phase AC voltage, into a DC voltage; and a control circuit for controlling conduction and non-conduction of a switching element which constitutes the rectifier circuit. The control circuit determines timing for causing the switching element of the rectifier circuit to be conductive or non-conductive based on a signal calculated from phase voltages of a first phase, a second phase, and a third phase that constitute a three-phase alternating current and an output voltage of the rectifier circuit.

According to an embodiment of the present invention, it is possible to provide an on-vehicle charging generator and a rectifier unit thereof with which highly efficient and stable operation can be attained.

BRIEF DESCRIPTION OF THE DRAWINGS

FIG. 2 shows a control circuit diagram of one phase of a three-phase rectifier unit of FIG. 1;

FIG. 8 shows a control circuit diagram of FIG. 7.

DETAILED DESCRIPTION OF THE PREFERRED EMBODIMENTS

Now, an embodiment of the present invention will be described with reference to the drawings. In this regard, as an example, the embodiment will be explained by using a rectifier unit of an on-vehicle charging generator which is driven by an engine and which supplies an electric power to a battery and an electric load of a vehicle.

According to the conventional technology described above, a phase voltage signal is detected by use of a predetermined threshold value. Therefore, particularly in an on-vehicle charging generator whose voltage set value for power generation is instructed by a signal from external devices such as an ECU, a MOSFET may not be operated effectively depending on the voltage set value for power generation. For example, when the voltage set value for power generation is set lower than a voltage corresponding to the predetermined threshold value, a phase voltage does not reach the predetermined threshold value. Therefore, the MOSFET is not turned on, and it takes longer time for a parasitic diode to perform rectification. Accordingly, the power loss in the full-wave rectifier increases and an electric power necessary for the electric load may not be obtained.

Moreover, when the number of revolutions is low or a generated electric amount is small, at the time of starting an engine etc., there occurs a distortion in a phase voltage waveform or the phase voltage waveform becomes close to a sine form. Therefore, precise on-timing or off-timing is not obtained and an electric current may flow backwards from a battery to an armature winding through the MOSFET.

Although it is possible to change a predetermined threshold value according to an external signal, the control circuit may become large in size, raising its manufacturing cost. Moreover, depending on power-generation states such as a power-generation electric current and the number of revolutions of the generator, there occurs distortion in the phase voltage. As a result, the MOSFET may not be operated efficiently. Therefore, it is conceivable to provide a detector for the number of revolutions etc. and turn on the MOSFET when the predetermined threshold value is exceeded. In such a case, however, the control circuit may become large in size, raising its manufacturing cost. Also, for the stable operation, it is possible to change the threshold value according to the voltage set value for generating power. In such a case also, the control circuit may become large in size, raising its manufacturing cost.

In view of the above, like an embodiment described below, there is provided a full-wave rectifier unit of an on-vehicle charging generator which comprises a switching element such as a MOSFET realizing a stable operation which is not influenced by a power generation state from a startup of an engine or distortion in a waveform caused by a mutual induction voltage produced between two armature windings.

First Embodiment

Figure 1:
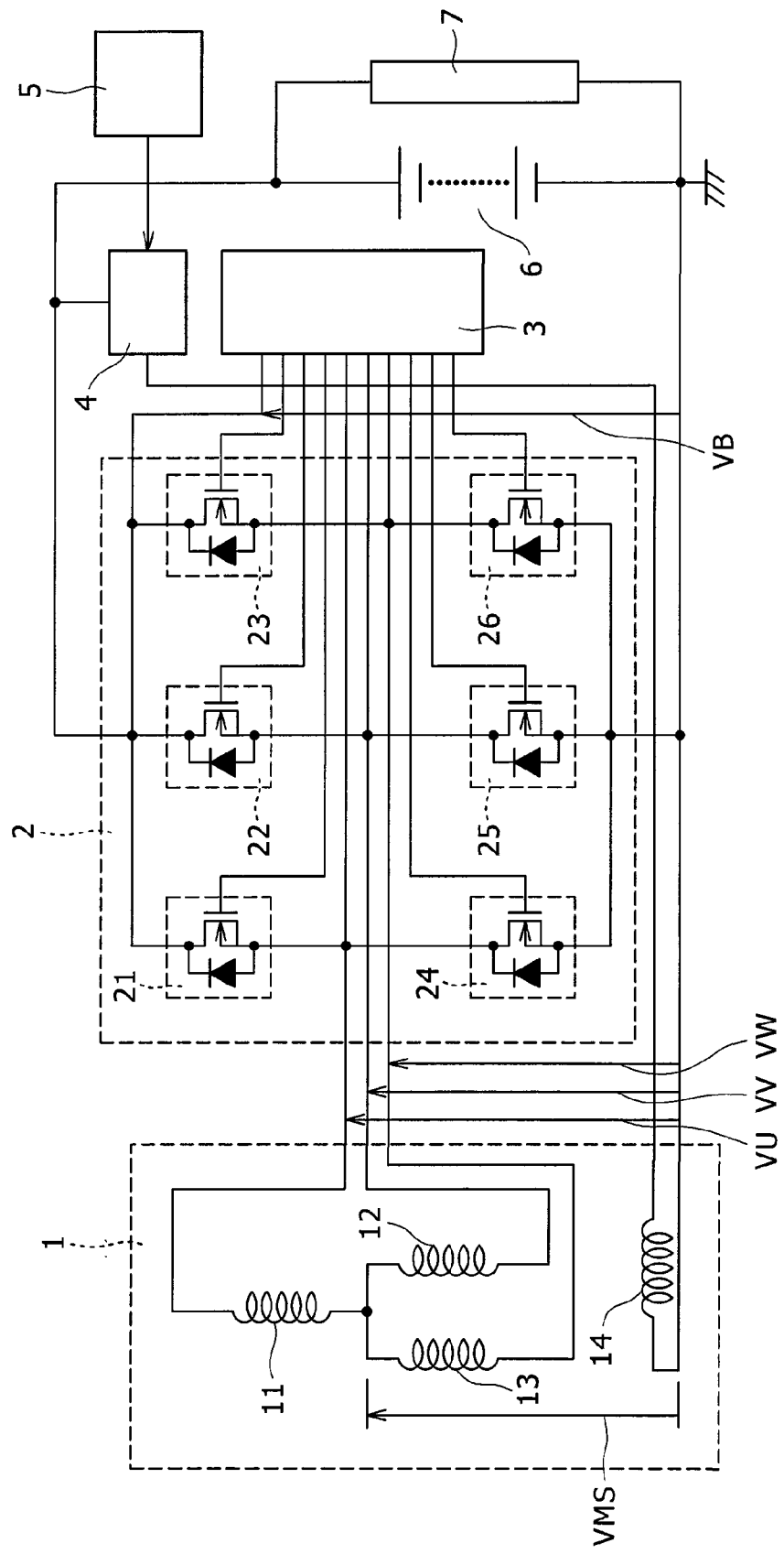
FIG. 1 shows a circuit diagram of an on-vehicle charging generator constituting one embodiment of the present invention.

FIG. 1 is a circuit diagram of an entire on-vehicle charging generator being one embodiment of the present invention.

In this regard, there is described: a three-phase charging generator 1; a three-phase rectifier circuit 2 for rectifying an output voltage of the three-phase charging generator 1; a control circuit 3 for the three-phase rectifier circuit 2; an electric-current control circuit 4 for the three-phase charging generator 1; a command control circuit 5 for the electric-current control circuit 4; a battery 6 mounted on a vehicle; and a load device 7 to which an electric power is supplied from the battery 6.

The three-phase charging generator 1 includes: a stator winging to which a U-phase, a V-phase, and a W-phase windings 11, 12, and 13 are connected by way of star connection; and a field winding 14 as a rotor winding. In order to control a generated voltage to be at a predetermined value, according to a command value from the command control circuit 5, an electric current of the field winding 14 is controlled by the electric-current control circuit 4, and the induction voltage of each phase winding is controlled.

In the three-phase rectifier circuit 2, on an upper-arm side, MOSFETs 21, 22, and 23 for rectification are connected to a plus terminal of the battery 6 through a common drain terminal. Also, on a lower arm side, MOSFETs 24, 25, and 26 are connected to a minus terminal (GND) through a common source terminal. Further, the U-phase, V-phase, and W-phase windings 11, 12, and 13 are connected to nodes of the source terminals and drain terminals of MOSFETs 21 and 24, MOSFETs 22 and 25, and MOSFETs 23 and 26, respectively.

In the control circuit 3 of the three-phase rectifier circuit 2, there are inputted an output voltage VB of the three-phase rectifier circuit 2 (hereafter, called an "output voltage VB of the rectifier circuit") and voltages VU, VV, and VW of the U phase, V phase, and W phase. Then, signals generated in electronic circuits of amplification, comparison, etc. are outputted as gate terminal voltages of the MOSFETs 21 to 26 so as to turn the MOSFETs 21 to 26 on or off.

Figure 3:
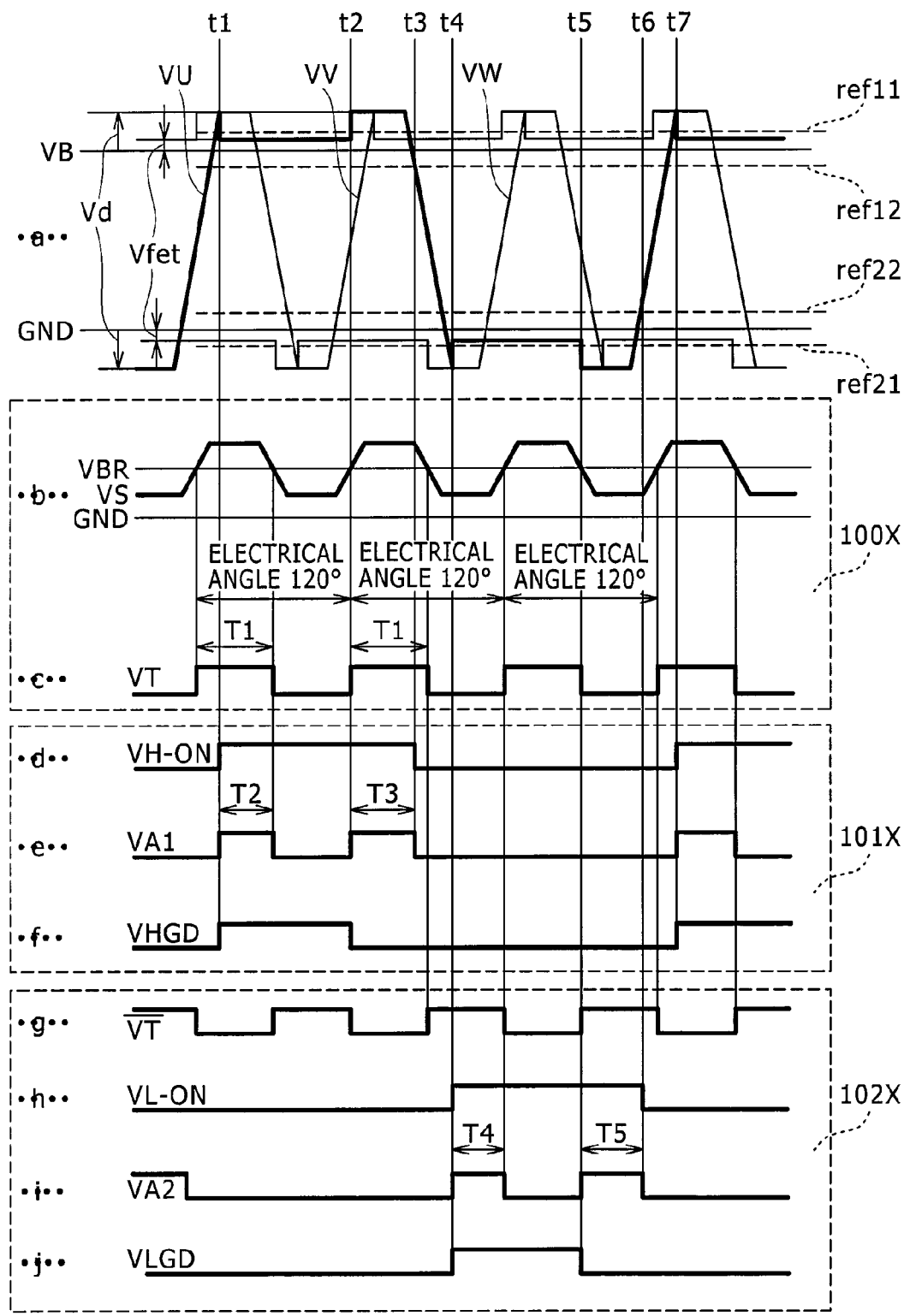
FIG. 3 illustrates an operation which is controlled by a control circuit of the rectifier unit of FIG. 1.

FIG. 2 shows a circuit diagram of the control circuit 3 and FIG. 3 shows waveforms of an operation. Now, the operation will be described.

The circuit diagram of FIG. 2 represents a generation circuit of gate terminal voltages VHGD and VLGD of the MOSFETs 21 and 24 of the upper and lower arms, respectively, corresponding to the U-phase winding 11. In the waveforms of the operation of FIG. 3, a thick line shows a U-phase voltage VU and thin lines show voltages VV and VW of the V phase and W phase in (a) of FIG. 3.

Moreover, 100X to 102X of FIG. 3 show waveforms of the operation corresponding to circuits 100 to 102 of FIG. 2.

In FIG. 2, the circuit 100 is a common circuit for generating the gate terminal voltages of the MOSFETs 21 and 24. The circuit 100 shifts levels of the U-phase voltage VU, the V-phase voltage VV, and the W-phase voltage VW by level shift circuits LS1 to LS3, performs addition by an operational amplifier OP1, and obtains an output voltage VS being one input VS of a comparator COM1.

In addition, the level shift circuits described above and below are the circuits for obtaining effective voltage levels in accordance with circuit elements to be used.

As the other input of the comparator COM1, an output voltage VB of the rectifier circuit is converted by a level shift circuit LS4 so as to obtain a reference value VBR.

(b) of FIG. 3 shows addition voltages VS of the U-phase, V-phase, and W-phase as well as the reference value VBR for the output voltage VB of the rectifier circuit whose level is shifted. Also, (c) of FIG. 3 shows a pulse output VT of the comparator COM1. The level of the pulse output VT turns high when VS>VBR and turns low when VS<VBR. A pulse width is T1, and a cycle is shown by an electrical angle of 120 degrees.

This cycle is a cycle equivalent to a phase difference of a three-phase voltage, and serves as a timing signal which shows a position in terms of time between phases of the three-phase.

A circuit 101 is a generation circuit for the gate terminal voltage VHGD of the MOSFET 21.

A difference voltage E1 is obtained by an operational amplifier by using, as inputs, the U-phase voltage VU and the output voltage VB of the rectifier circuit through the level shift circuits LS5 and LS6, respectively. Then, it is compared by a comparator COM2 which has hysteresis characteristics of ref11 and ref12 of a reference voltage Vref1.

As shown in (d) of FIG. 3, the output of the comparator COM2 is a pulse output VH-ON which is outputted at time t1 when the U-phase voltage VU is equivalent to the reference voltage ref11 which is higher than the output voltage VB of the rectifier circuit. Also, the pulse output VH-ON is not outputted at time t3 when the U-phase voltage VU is equivalent to the reference voltage ref 12 which is lower than the output voltage V of the rectifier circuit.

When the pulse output VT being a timing signal and the pulse output VH-ON of the comparator COM2 undergo an AND operation by a circuit AND1, as shown in (e) of FIG. 3, a pulse output VA1 of the pulse widths T2 and T3 is obtained, time of the pulse widths being T2<T3.

The pulse output VA1 of the AND circuit AND1 in (e) of FIG. 3 is inputted to a clock terminal CLK of a flip-flop FF1. In synchronism with rising of the clock terminal CLK, an output Q of the flip-flop FF1 varies from a high level to a low level and vice versa. Then, a pulse output shown in (f) of FIG. 3 turns into a gate terminal voltage VHGD of the MOSFET 21.

A circuit 102 is a generation circuit of the gate terminal voltage VLGD of the MOSFET 24.

Using, as inputs, the output of a level shift circuit LS 5 of the circuit 101 and a GND potential of the output voltage VB of the three-phase rectifier circuit 2, a difference voltage E2 is obtained by an operational amplifier OP3, and compared by a comparator COM 3 having hysteresis characteristics of ref21 and ref22 of a reference voltage Vref2.

As shown in (h) of FIG. 3, the output of the comparator COM2 becomes a pulse output VL-ON in which output is performed at time t4 when the U-phase voltage VU is equivalent to the reference voltage Ref21 which is lower than a GND potential of the output voltage VB of the rectifier circuit and the output is not performed at time t6 when the U-phase voltage VU is equivalent to the reference voltage Ref22 which is higher than the GND potential of the output voltage VB of the rectifier circuit.

When an inverse pulse VT ((g) of FIG. 3) made by inverting a common pulse output VT by an inverter INV and the pulse output VL-ON of a comparator COM3 are subjected to an AND operation, as shown in (i) of FIG. 3, a pulse output VA2 of pulse widths T4 and T5 is obtained, where pulse widths being T4<T5.

The pulse output VA2 of the AND circuit AND2 in (i) of FIG. 3 is inputted to a clock terminal CLK of a flip-flop FF2. In synchronism with rising of the clock terminal CLK, the output Q of the flip-flop FF2 varies from a high level to a low level and vice versa, and the pulse output shown in FIG. 3(j) becomes a gate terminal voltage VLGD of the MOSFET 24.

Next, an operation when a gate terminal voltage is impressed to the MOSFETs 21 and 24 will be described.

When the gate terminal voltages VHGD and VLGD are impressed to the MOSFETs 21 and 24, respectively, the U-phase voltage VU comes to have a waveform shown by the thick line in (a) of FIG. 3.

Incidentally, because of its cellular structure, a parasitic diode is generated in the MOSFET. When a voltage is not impressed to the gate terminal of the MOSFET, if a potential of a source terminal is higher than that of a drain terminal, the diode is conducted and there occurs between the source and drain of the MOSFET a forward voltage drop Vd of the diode.

On the other hand, when a voltage is impressed to the gate terminal, the MOSFET is conducted in a direction from the source to the drain and there occurs a voltage drop Vfet lower than the forward voltage drop of the diode between the source and drain of the MOSFET.

As the U-phase voltage VU increases, at time t1, it become higher than the output voltage VB of the rectifier circuit and the pulse voltage VHGD in (f) of FIG. 3 is impressed to the gate terminal of the MOSFET 21.

When the MOSFET 21 is conducted, the U-phase voltage becomes equivalent to a value made by adding the voltage drop Vfet of the MOSFET 21 to the output voltage VB of the rectifier circuit. The MOSFET 21 continues to be conductive until the period t1 to t2 where the pulse voltage VHGD in (f) of FIG. 3 is impressed.

When the pulse voltage VHGD is no longer impressed at time t2, during a period where VB>VU after time t2, the diode is conducted instead of the MOSFET 21. The U-phase voltage VU becomes equivalent to a value made by adding the voltage drop Vd of the diode to the output voltage VB of the rectifier circuit.

As the U-phase voltage VU becomes smaller than the output voltage VB of the rectifier circuit, at time t4 when it is lower than the GND potential, the pulse voltage VLGD in (j) of FIG. 3 is impressed to a gate terminal of the MOSFET 24.

When the MOSFET 24 is conducted, the U-phase voltage VU undergoes the voltage drop Vfet of the MOSFET 24 being lower than the GND level. The MOSFET 21 continues to be conductive until the period t4 to t5 when the pulse voltage VLGD in (j) of FIG. 3 is impressed.

When the pulse voltage VLGD is no longer impressed at time t5, during the period where VU<GND after time t5, the diode is conducted instead of the MOSFET 24. The U-phase voltage VU undergoes the voltage drop Vd of the diode being lower than the GND potential.

Thus, as rectifying operations, the MOSFET rectifying operation is performed from time t1 to t2 and from time t4 to t5. The diode rectifying operation by the parasitic diode is performed from time t2 to a period of VU>VB and from time t5 to the period of VU<GND, and t1, t2, t4, and t7 are switching points.

So far, with reference to FIGS. 2 and 3, the U-phase voltage waveform as well as generation of the gate terminal voltages of the U-phase MOSFETs 21 and 24 have been described. Now, the control circuit for the entire three-phase rectifier circuit 2 and the voltage waveform will be described.

Figure 4:
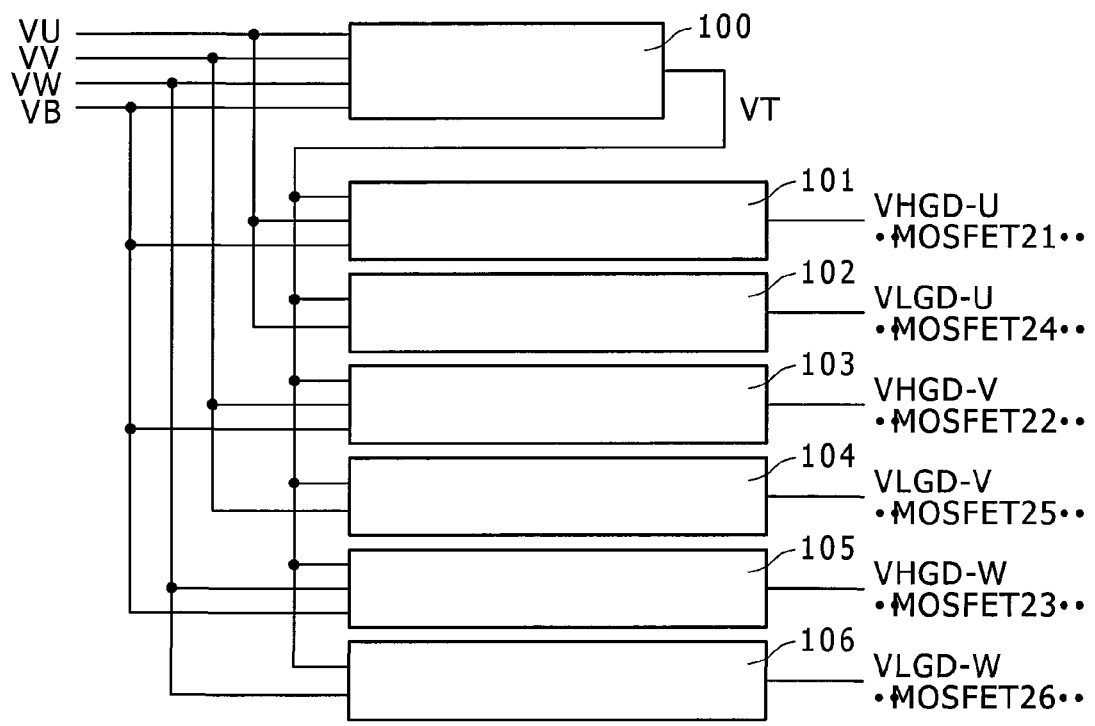
FIG. 4 shows a block diagram of the control circuit of the three-phase rectifier unit of FIG. 1.

FIG. 4 is a block diagram showing a generation circuit of gate terminal voltages of the U-phase, V-phase, and W-phase MOSFETs.

A circuit 100 is identical to the circuit 100 of FIG. 2, being a common circuit for U-phase to W-phase. Its output is a pulse output VT in (c) of FIG. 3.

Circuits 101 and 102 are U-phase circuits shown in FIG. 2, and they output gate terminal voltages VHGD-U and VLGD-U of the MOSFETs 21 and 24.

Except that the V-phase voltage is inputted instead of the U-phase voltage, configurations of circuits 103 and 104 are identical to those of the circuits 101 and 102. They output gate terminal voltages VHGD-V and VLGD-V of the MOSFETs 22 and 25.

Except that a W-phase voltage is inputted instead of the U-phase voltage, configurations of circuits 105 and 106 are identical to those of the circuits 101 and 102. The circuits 105 and 106 output gate terminal voltages VHGD-W and VLGD-W of the MOSFETs 23 and 26.

When the above gate terminal voltages are impressed to a MOSFET of a three-phase rectifier circuit 2, they become the U-phase voltage VU shown by a thick line and the V-phase and W-phase voltages VV and VW shown by thin lines in (a) of FIG. 3, the three-phase rectifier circuit 2 being controlled as a whole.

Incidentally, the voltage drop between the drain and source of the MOSFET generates heat as a power loss of an element. At the same time, in a voltage control of the output voltage of the rectifier circuit, it causes a useless voltage, lowering the power generation efficiency of the three-phase charging generator 1.

According to the first embodiment through adoption of the MOSFET rectifying operation, as is clear from the output voltage VU shown by the thick line in (a) of FIG. 3, by allowing the MOSFET to be conductive, the voltage drop can be reduced to Vfet with respect to the voltage drop vd by the diodes of the MOSFETs 21 and 24. Therefore, the power loss of the element can be reduced and, further, power generation efficiency of the three-phase charging generator 1 can be raised.

Incidentally, according to the first embodiment, in the comparator COM1, by using the output voltage VB of the rectifier circuit as a reference, a timing signal VT in (c) of FIG. 3 obtained in the circuit 100 of FIG. 2 is outputted in comparison with the addition values VS of the U, V, and W phases.

Even though the output voltage VB of the rectifier circuit is controlled to be a different value by a current control circuit 4 of a field winging 14, the reference value VBR of the output voltage VB of the rectifier circuit follows automatically. Therefore, a stable timing signal VT of the cycle of 120 degrees can be obtained.

Thereby, ON and OFF timing of the MOSFET can be properly controlled. Therefore, an adverse current from the battery 6 can be prevented, and the MOSFET rectifying operation can be reliably performed.

As an example of controlling the output voltage VB of the rectifier circuit to be a different value, there is a case where a command control circuit 5 is provided in the engine control unit of a vehicle and, with battery charging most appropriate for an injection-of-fuel control or an ignition control being a target, a command value is outputted to the current control circuit 4.

Thus, a further effect of the first embodiment is as follows. That is, in addition to the case where the power-generation control circuit for controlling the output voltage of the rectifier circuit independently exists and controls a constant output voltage of the rectifier circuit, even in a case where the power-generation control circuit is operated by a signal from an external device and controls power generation voltages having different values, the operation is reliably switched to a stable MOSFET rectifying operation.

Further, in the cases where the number of revolutions of the three-phase charging generator 1 is low or an amount of generated power is small at a startup of an engine etc., in (c) of FIG. 3, VS is smaller than VBR. As a result, the timing signal VT turns low.

Therefore, variation in startup does not occur in outputs VA1 ((e) of FIG. 3) and VA2 ((i) of FIG. 3) of logical products AND1 and AND2. Accordingly, the outputs of the flip-flops FF1 and FF2, namely, the gate terminal voltages VHGD and VLGD of the MOSFET turn low, the MOSFET being not conducted. Thus, the three-phase rectifier circuit 2 is in a state of the diode rectifying operation by a parasitic diode.

When the number of rotations rises or the amount of generated power increases, VS becomes greater than VBR. Accordingly, a gate terminal voltage of the MOSFET is generated and the MOSFET is conducted, automatically switching to the MOSFET rectifying operation.

Thus, a further effect of the first embodiment is as follows. That is, the switching from the MOSFET rectification to the diode rectification and vice versa is automatically performed. Therefore, processing about the output voltage of the rectifier circuit and the number of revolutions of the three-phase charging generator 1 can be eliminated.

Moreover, when the number of revolutions is low or the amount of generated power is small, distortion occurs in each phase voltage.

However, the reference value VBR which is one input of the comparator COM1 is set from the output voltage VB of the rectifier circuit each phase voltage of which is full-wave rectified. Therefore, an influence of the distortion of each phase voltage is eliminated and a timing signal VT can be obtained.

Further, an addition voltage VS which is the other input of the comparator COM1 is set by being added in an adder OP1 of the common circuit 100 of FIG. 2. However, different voltages of an increase portion and a decrease portion of each phase voltage are added. Therefore, an effect of a partial waveform distortion is eliminated and the timing signal VT can be obtained.

As described above, even in the case of the phase voltages VU, VV, and VW where distortion occurs, switching to the MOSFET rectifying operation can be performed reliably and stably.

Second Embodiment

In the case of the first embodiment, as shown in (a) of FIG. 3, there exists a period of the diode rectifying operation even during the periods when the phase voltages VU, VV, and VW are higher than the output voltage VB of the rectifier circuit and the phase voltages VU, VV, and VW are lower than the GND potential.

If the U phase is taken as an example, the diode rectifying operation is performed from time t2 to the period VU>VB and from time t5 to the period VU<GND. Thus, the power loss of the MOSFET is great, lowering the power-generation efficiency of the three-phase charging generator.

According to the second embodiment, during the periods of VU>VB and VU<GND, the period of the MOSFET rectifying operation is made longer and the period of the diode rectifying operation is shortened.

Figure 5:
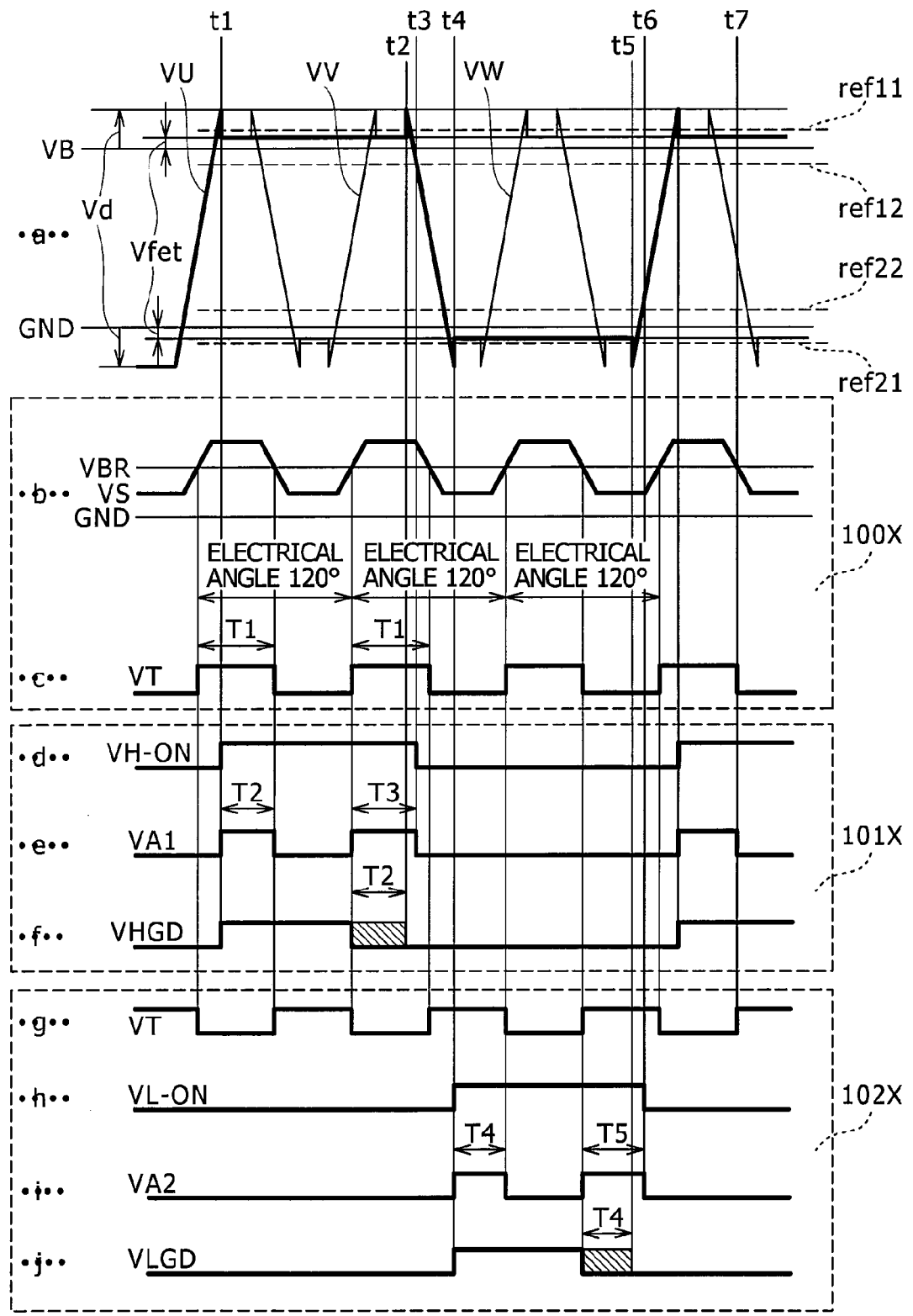
FIG. 5 illustrates an operation which is controlled by a control circuit constituting one embodiment of the present invention.
Figure 6:
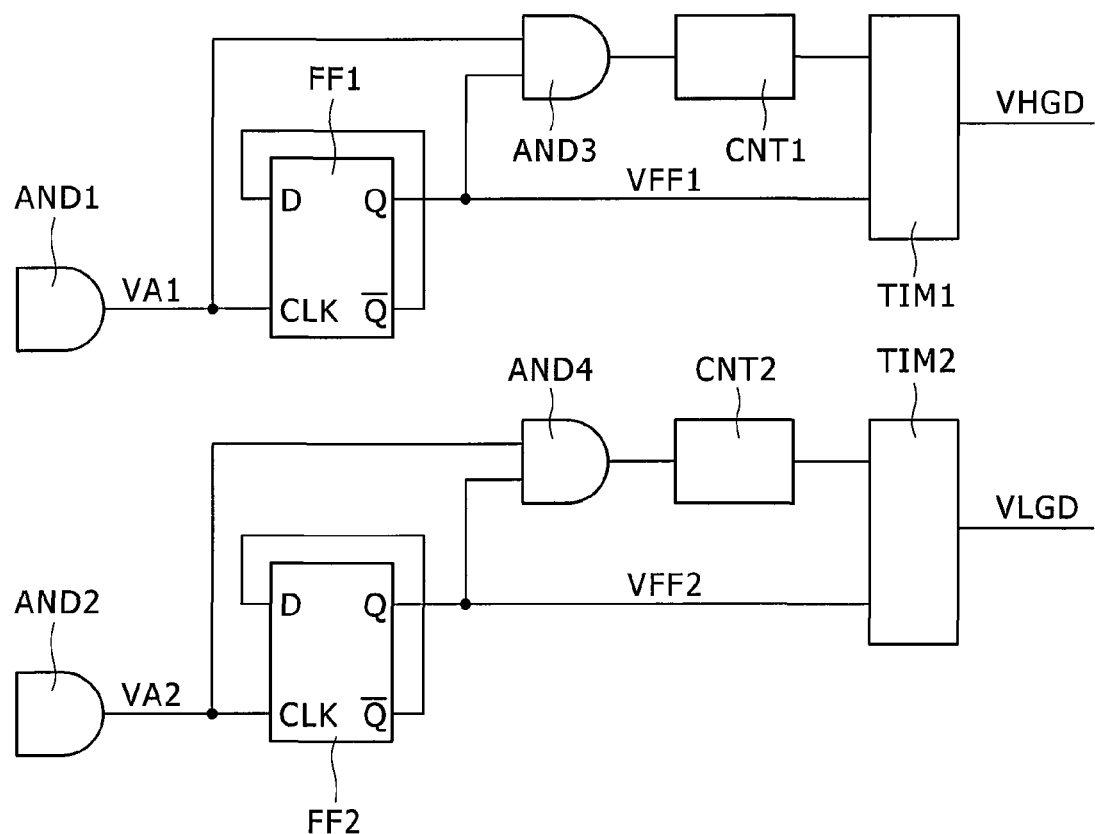
FIG. 6 shows a control circuit diagram of FIG. 5.

FIG. 5 shows a waveform of operation of the second embodiment and FIG. 6 is a circuit configuration diagram. Now, the U phase will be described.

In order to turn the diode rectifying operation during the period VU>VB after time t2 shown in FIG. 3 of the first embodiment into the MOSFET rectifying operation, as shown in (f) of FIG. 5, in synchronism with the fall of the gate terminal voltage VHGD of an upper-stream side MOSFET 21, of the pulse output VA1 of the logical product AND1, the voltage is delayed by time corresponding to a pulse width T2.

As described in the first embodiment, in the pulse output VA1, there is a relationship of T2<T3. Therefore, even if the gate terminal voltage VHGD is delayed by T2, the conductive period of the MOSFET 21 stays within the period of VU>VB, and the current does not flow backward from the battery 6.

On the other hand, as shown in (j) of FIG. 5, the gate terminal voltage VLGD of a down-stream side MOSFET 24 is, of the pulse output VA2 of the logical product AND2, delayed by time corresponding to a pulse width T4.

When the gate terminal voltages VHGD and VLGD of the MOSFETs 21 and 24 are delayed, with respect to the U-phase voltage VU shown by a thick line in (a) of FIG. 5, the MOSFET rectifying operation continues from time t1 to t2.

FIG. 6 shows a circuit configuration in which the gate terminal voltages VHGD and VLGD are delayed.

By logical products AND3 and AND4, pulse widths T2 and T4 of the pulse outputs VA1 and VA2 are extracted from the outputs VFF1 and VFF2 of the flip-flops FF1 and FF2. Then, the pulse width time is measured by counters CNT1 and CNT2 to be stored.

Further, in synchronism with the fall of the outputs VFF1 and VFF2, the output is delayed by time corresponding to the pulse width T2 and T4 by timers TIM1 and TIM2 so that the gate terminal voltages VHGD and VLGD are obtained.

According to the present embodiment, by lengthening the period of the MOSFET rectifying operation, further power loss of an element can be reduced, further improving the power generation efficiency of the three-phase charging generator 1.

According to the above description, the outputs VFF1 and VFF2 of the flip-flops FF1 and FF2 are delayed by time corresponding to the pulse widths T2 and T4 of the pulse outputs VA1 and VA2 so that the MOSFET rectifying operation is utilized as much as possible.

Incidentally, when the gate terminal voltages VHGD and VLGD are delayed by time corresponding to the pulse widths T2 and T4 in the case where the effect of distortion cannot completely be eliminated and because of the effects of the value of each phase voltage being very close to the output voltage VB of the rectifier circuit or respective phase voltages having different values in such a case, the consideration may be needed with respect to extension to the range of battery voltage>phase voltage.

Therefore, regarding the time of the pulse widths T2 and T4 as a maximum delay time, within the range of these pulse widths, the delay time can also be set.

That is, a second best effect can be obtained with respect to the effect of delaying by time corresponding to the pulse widths T2 and T4.

In the present embodiment, with respect to other operations and effects described in the first embodiment, similar operations and effects can be obtained.

The waveform chart 3(b) of the common circuit 100 which generates the gate terminal voltages of the MOSFETs 21 and 24 in the above embodiment shows an example in which the reference value VBR of the comparator COM1 is set to a value close to a mean value of the addition voltage VS. As explained in the first embodiment, when the output voltage VB of the rectifier circuit is controlled to be a different value, the reference value VBR varies.

Figure 7:
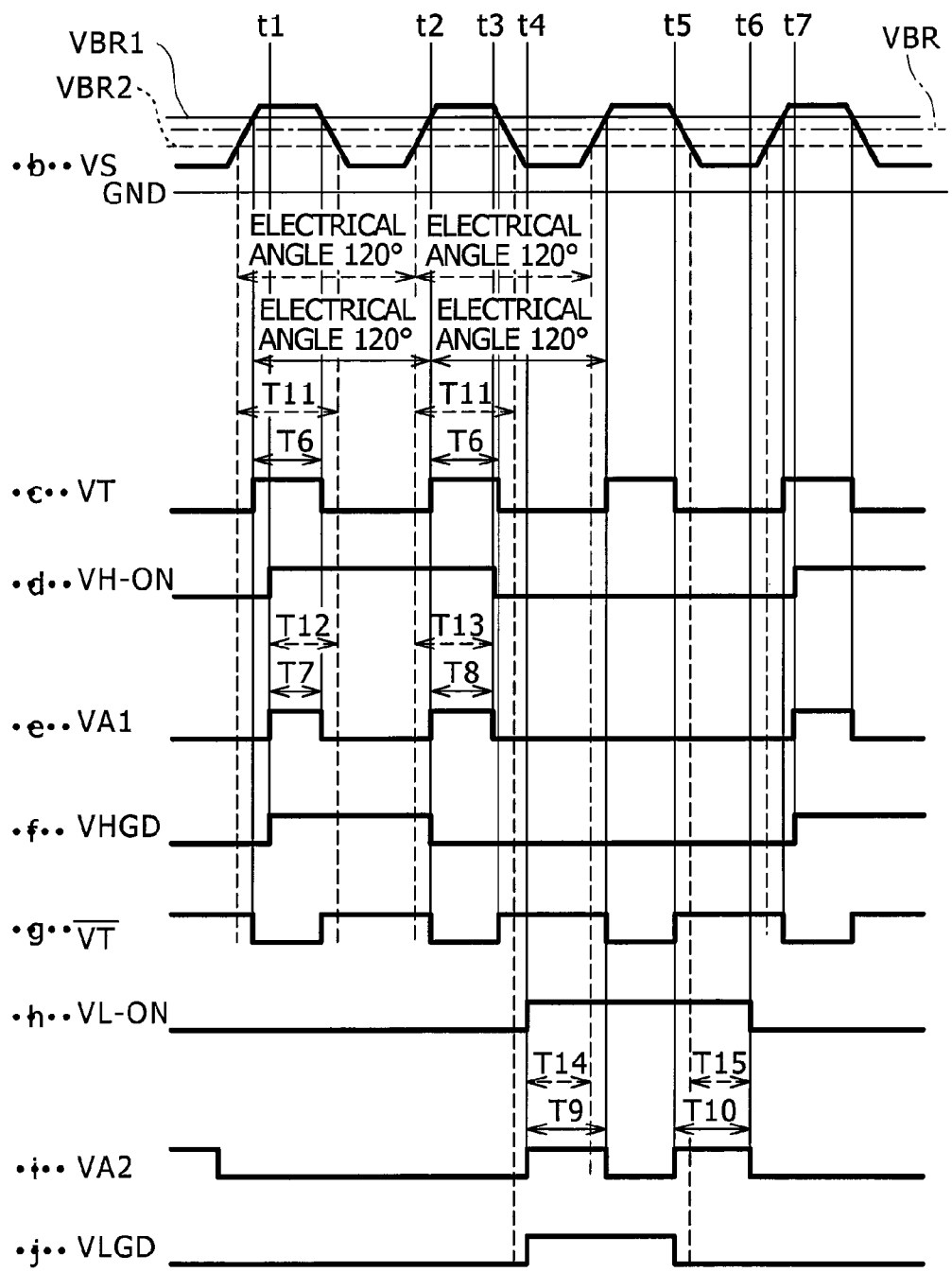
FIG. 7 illustrates an operation according to one embodiment of the present invention.

FIG. 7 shows waveforms of operation in a case where the reference value is set to VBR1 which is greater than VBR or to VBR2 which is smaller than VBR.

At the reference value VBR1, a time width T6 of the timing signal VT shown in FIG. 5(c) becomes shorter than the time width T2 of VT shown in FIG. 3(c). At the reference value VBR2, a time width T11 of the timing signal VT shown by FIG. 5(c) becomes longer than the time width T2 shown by FIG. 3(c). However, periods thereof become equivalent being an electrical angle of 120 degrees.

Pulse outputs VA1 and VA2 of the logical products AND1 and AND2 obtained from theses timing signals VT as well as VH-ON and VHLO have relationships of T7<T8, T9<T10 as well as T12<T13, and T14<T15.

The gate terminal voltage VHGD thus generated is outputted in synchronism with the rising of T7 and T12, and is no longer outputted in synchronism with rising of T8 and T13. Also, VLGD is outputted in synchronism with rising of T9 and T14 and is no longer outputted in synchronism with rising of T10 and T15. That is, these operations are similar to the ones shown in FIGS. 3 and 5.

Moreover, regarding time T2 at which the gate terminal voltage VHGD is delayed and time T4 at which VLGD is delayed as shown in FIG. 5, T7 and T12 are delayed with respect to VHGD and T9 and T14 are delayed with respect to VLGD, which are similar to the operation in FIG. 5.

That is, an effect similar to the above embodiment can be obtained.

In the above embodiment, the circuit in FIG. 2 is connected with two or more electronic circuits or comprises a flip-flop which is operated by the rise and fall in the pulse output. Therefore, it requires a circuit configuration which can cope with a malfunction caused by a noise.

One of the most serious malfunctions is the case where a gate terminal voltage is impressed to the MOSFET in a state where the voltage of the battery 6 is high with respect to the phase voltages VU, VV, and VW. In such a case, damage is caused in the MOSFET where a short-circuit current flows in its rectifier unit from the battery 6 to a phase winding through the MOSFET and an inverse current flows in the charging generator.

Therefore, as shown in FIG. 8, outputs, processed by AND circuits AND 5 and AND 6, of the gate terminal voltages VHGD and VLGD, difference voltages E1 and E2 made by outputting a deflection between the output voltage VB of the rectifier circuit and each phase voltage shown in FIG. 2 by OP2 and OP3, and outputs VH-ON and VL-ON of comparators COM2 and COM3 for comparing with reference voltages Vref1 and Vref2 are regarded as voltages VHGDO and VLGDO to be actually impressed to the gate terminal, and the reference voltages Vref1 and Vref2 are set as follows.

That is, a low-level voltage ref12 of the reference voltage Vref1 and a high-level voltage ref22 of the reference voltage Vref2 shown in FIGS. 3 and 5 are set such that an inverse current flowing through the MOSFETs 21 to 26 are equal to or lower than an acceptable value.

With the above circuit configuration of FIG. 8 and the setting of the reference voltages Vref1 and Vref2, even when there occurs a malfunction caused by a noise etc. entering the circuit, the inverse current flowing through the MOSFET can be equal to or lower than the acceptable value, preventing the charging generator and MOSFET from being damaged.

Incidentally, in the above embodiment, the phase voltages VU, VV, and VW of the three-phase changing generator 1 are added by the operational amplifier OP1 to be the addition voltage VS. However, the voltage made by shifting the level of a neutral point voltage VMS in which phase windings 11, 12, and 13 of the three-phase charging generator 1 of FIG. 1 are connected by way of star connection can be the addition voltage VS. In such a way, similar operations and effects can be obtained.

In the above embodiment, the case where the phase windings 11, 12, and 13 of the three-phase charging generator 1 are connected by star connection. However, operations and effects of the present invention are almost the same even when a three-phase charging generator of delta connection is used.

Moreover, in the above embodiment, the output voltage VB of the rectifier circuit taken in the control circuit 3 is the output voltage of the three-phase rectifier circuit 2. However, the similar operations and effects are obtained even when the three-phase rectifier circuit is constituted by use of the phase voltages VU, VV, and VW in the control circuit and utilizing its output voltage as the output voltage VB of the rectifier circuit.

Moreover, in the above embodiment, the three-phase rectifier circuit 2 of the three-phase charging generator 1 is used. However, the generator and the rectifier are not limited to the ones of three-phase, and a control by a multi-phase generator with a multi-phase rectifier can also be applied.

According to the embodiments described above, the operation of the full-wave rectifier comprising a switching element such as a MOSFET is not influenced by a power generating state when starting the engine or distortion of the waveform caused by the mutual induction voltage occurring between two armature windings. Therefore, the power loss of the full-wave rectifier is reduced and the power generating efficiency can be raised.

What is claimed is:

1. A rectifier unit for an on-vehicle charging generator, comprising:
   a rectifier circuit which full-wave rectifies and turns an AC output voltage of an armature winding outputting a three-phase AC voltage into a DC voltage; and
   a control circuit which causes a switching element constituting the rectifier circuit to be conductive or non-conductive;
   wherein the control circuit determines timing of causing the switching element of the rectifier circuit to be conductive or non-conductive based on a computation signal calculated from phase voltages of a first phase, a second phase, and a third phase making up the three-phase current and an output voltage of the rectifier circuit; and
   wherein the computation signal is determined based on a comparison signal which is made by comparing an addition signal based on the first, second, and third phase voltages and a power generation signal based on an output voltage of the rectifier circuit.

2. The rectifier unit of claim 1, wherein the addition signal is a voltage division signal of the phase voltage made by dividing the first, second, and third phase voltages.

3. The rectifier unit of claim 2, wherein the voltage division signal of the phase voltage is made by dividing the first, second, and third phase voltages at the same ratio.

4. The rectifier unit of claim 1, wherein the power generation signal is a voltage division signal which is made by dividing the output voltage of the rectifier circuit.

5. The rectifier unit of claim 4, wherein a voltage-dividing ratio of the power generation signal when an output voltage of the rectifier circuit is lower than a voltage between battery terminals, is set so as to be a first set value higher than the addition signal.

6. The rectifier unit of claim 1, wherein the generation circuit of the computation signal comprises:
   a second comparison means which compares a difference of deflection between a phase voltage of any of the first, second, or third phases to be controlled and an output voltage of the rectifier circuit with a second set value; and
   a third comparison means which compares a difference of deflection between the phase voltage of the phase and a GND voltage with a third set value.

7. The rectifier unit for the on-vehicle charging generator of claim 6, wherein:
   the second and third set values have high and low levels; and the low level of the second set value and the high level of the third set value are set within a range of an inverse-current acceptable value of the switching element.

8. The rectifier unit of claim 1, wherein the rectifier circuit comprises a MOSFET.

9. The rectifier unit of claim 1, wherein the control circuit controls so as to prohibit driving a gate of the MOSFET and to perform rectification by using a parasitic diode of the MOSFET when the addition signal is lower than the power generation signal.

10. The rectifier unit of claim 1, wherein:
a low level and a high level of the comparison signal are switched based on a comparison result of the addition signal and the power generation signal; and
the control circuit determines interruption timing, when determining the interruption timing of the switching element, by using a delay time determined based on a time period from when a difference of deflection between a phase voltage of a phase of the switching means and an output voltage of the rectifier circuit reaches a predetermined voltage to when the comparison signal turns from the high level to the low level and vice versa.

11. The rectifier unit of claim 1, wherein, using time when the comparison signal turns from the high level to the low level and, further, turns again from the low level to the high level as timing for interrupting an action of the switching element, the control circuit instructs the interruption of the switching element based on the interruption timing.

12. The rectifier unit of claim 11, wherein, using the interruption timing of the switching element as a starting point, the control circuit instructs the interruption of the switching element after the delay time determined based on the time period from when the difference of deflection between the phase voltage of the phase of the switching element and the output voltage of the rectifier circuit reaches the predetermined voltage to when the comparison signal turns from the high level to the low level and vice versa.

13. The rectifier unit of claim 11, wherein, using the interruption timing of the switching element as a starting point, the control circuit instructs the interruption of the switching element during the delay time determined based on the time period from when the difference of deflection between the phase voltage of the phase of the switching element and the output voltage of the rectifier circuit reaches the predetermined voltage to when the comparison signal turns from the high level to the low level and vice versa.

* * * * *